United States Patent [19]

Montague et al.

[11] 4,044,660
[45] Aug. 30, 1977

[54] AUTOMATIC TOASTER

[75] Inventors: Douglas P. Montague, Chicago; Derek A. Brand, Naperville; Howard J. Morrison, Deerfield, all of Ill.

[73] Assignee: Marvin Glass & Associates, Chicago, Ill.

[21] Appl. No.: 664,918

[22] Filed: Mar. 8, 1976

[51] Int. Cl.² .................................... A47J 37/08
[52] U.S. Cl. .................................. 99/326; 99/343; 99/387; 99/390; 221/253
[58] Field of Search ............... 99/387, 389, 390, 326, 99/391, 386, 343, 443 C; 221/253; 219/214

[56] References Cited

U.S. PATENT DOCUMENTS

| | | | |
|---|---|---|---|
| 1,184,153 | 5/1916 | Weisner | 221/253 X |
| 1,797,628 | 3/1931 | Whiting | 99/387 |
| 2,014,595 | 9/1935 | Simmons | 99/387 X |
| 2,151,401 | 3/1939 | Belcher | 99/387 X |
| 2,253,027 | 8/1941 | Hall | 221/253 |
| 2,731,131 | 1/1956 | Shannon | 221/253 X |

Primary Examiner—Billy J. Wilhite

Attorney, Agent, or Firm—Mason, Kolehmainen, Rathburn & Wyss

[57] ABSTRACT

An automatic toaster for continuously toasting bread slices one at a time, from the bottom of a generally vertical stack of bread slices. The bread toaster includes a housing having a discharge opening at one end and a hopper at the other end for receiving a vertical stack of bread slices. A conveyor feeds the bread slices one at a time between a pair of heating elements whereafter the bread is ejected through the discharge opening in the housing. The pair of heating elements are mounted above and below the conveyor and are movable toward and away from the conveyor so the amount of toasting on each bread slice can be determined according to the preference of the user. An automatic counter is connected to the conveyor for counting the number of slices being toasted and for turning off the toaster after a predetermined number of slices of toast have been made. A mechanism is provided for intermittently lifting the stack of bread from the second to the bottom slice thereof to facilitate moving the lowermost slice from the stack.

8 Claims, 9 Drawing Figures

U.S. Patent  Aug. 30, 1977  Sheet 1 of 4  4,044,660
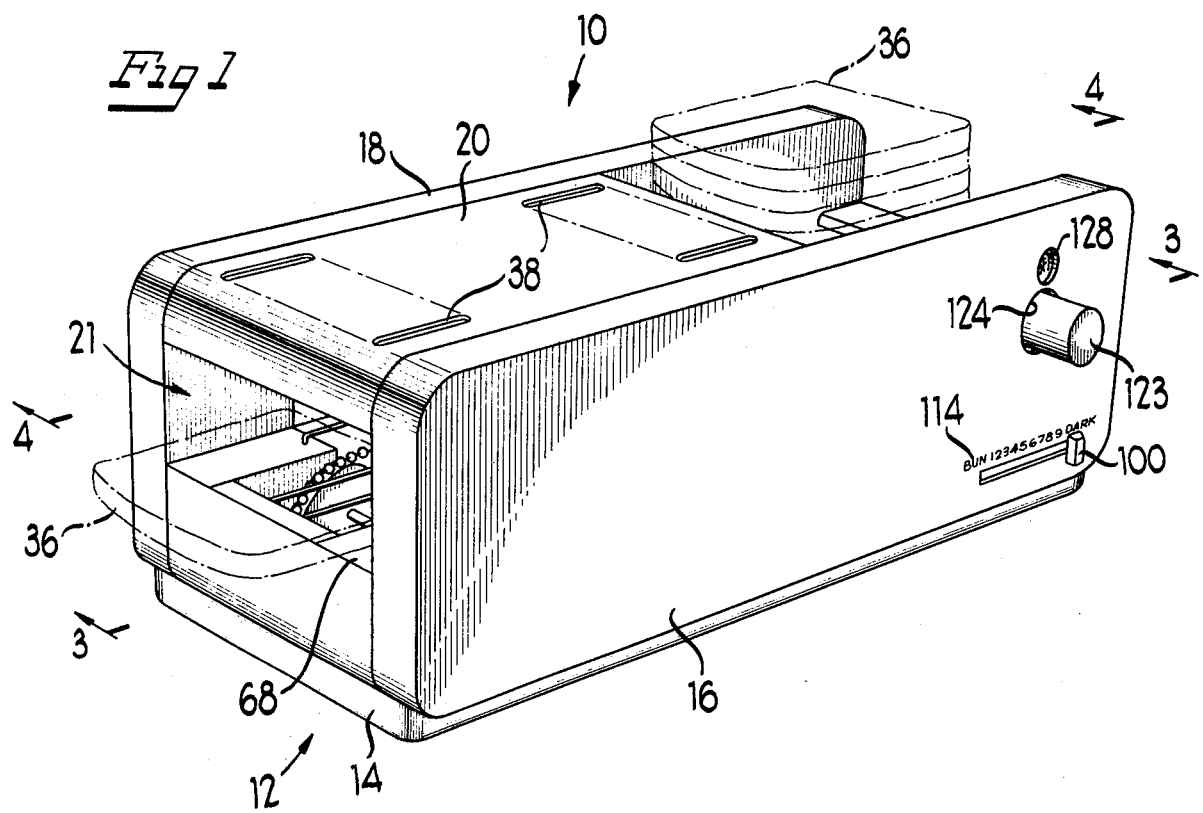
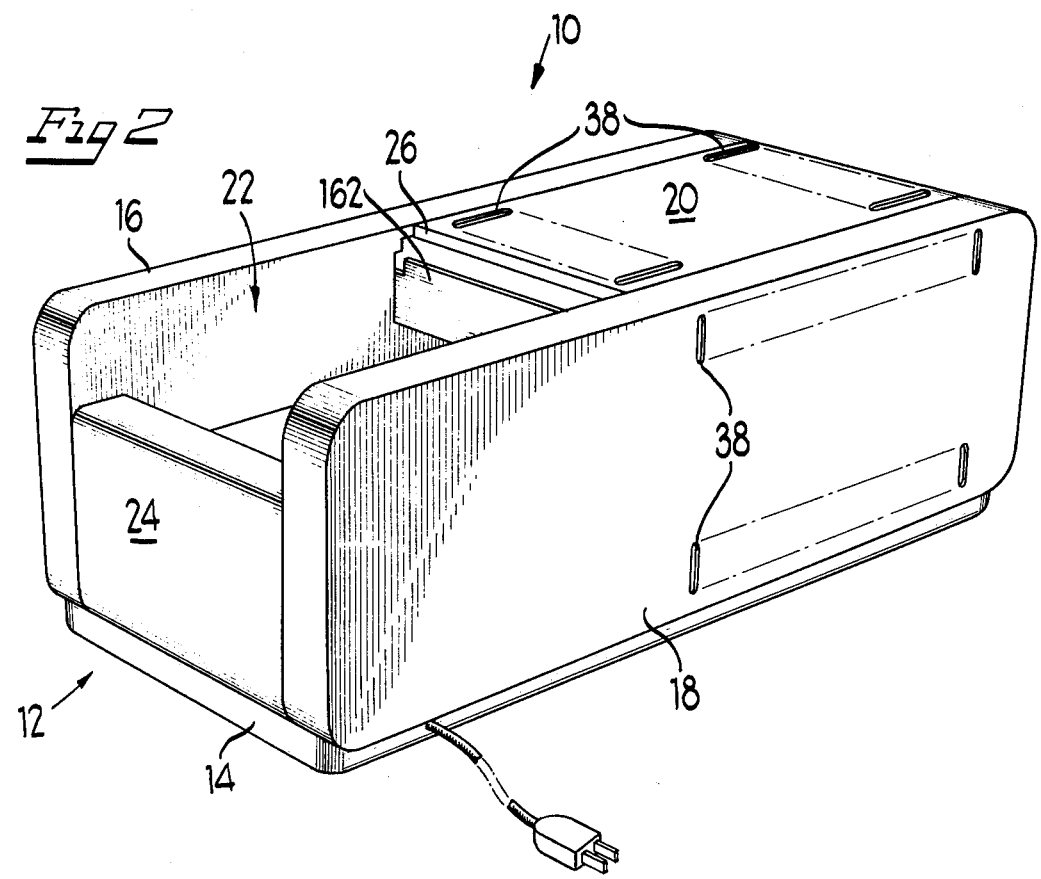

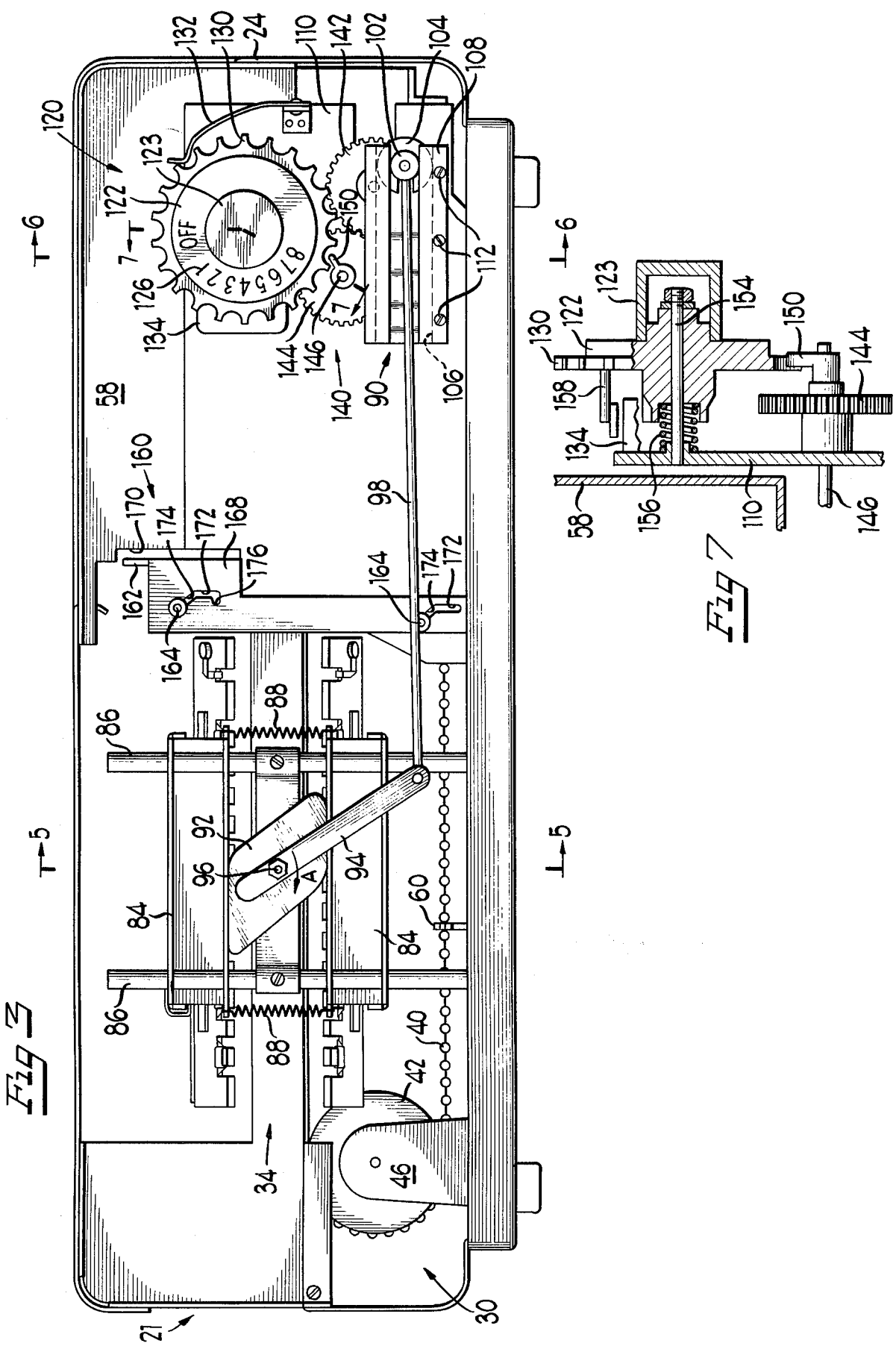

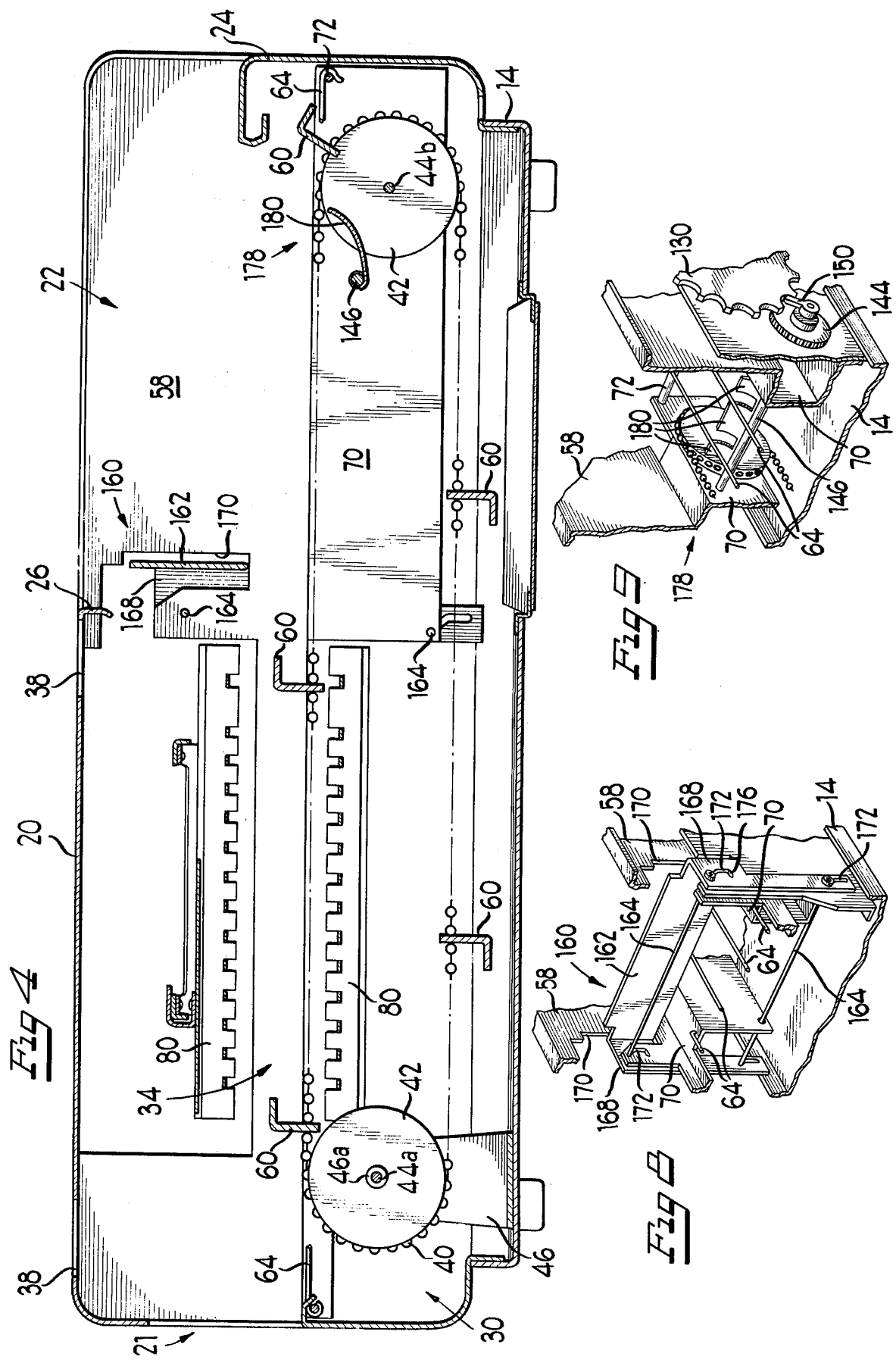

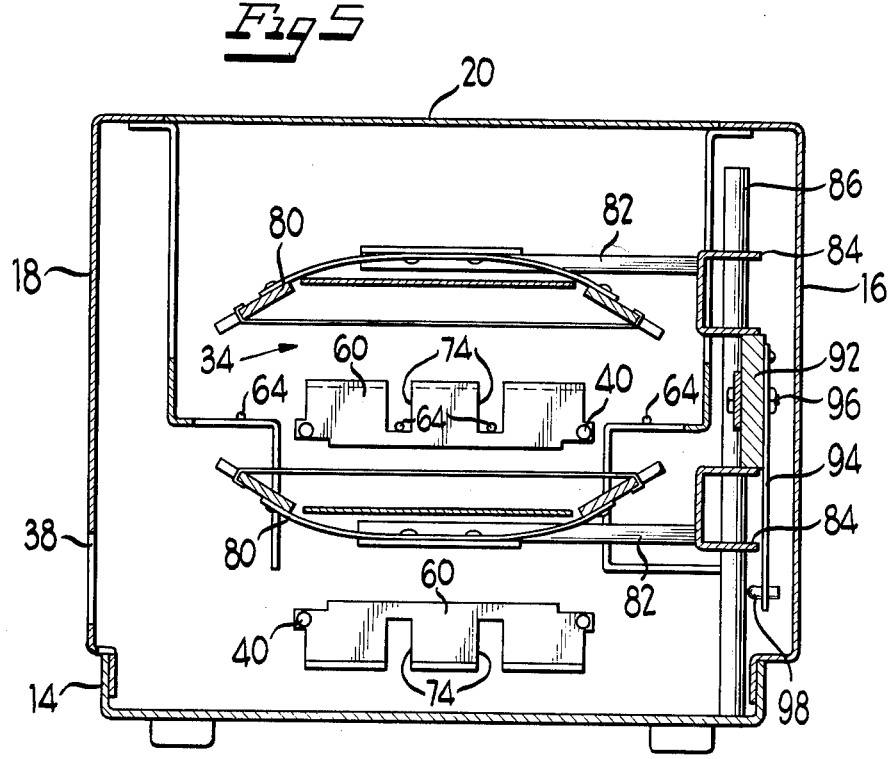
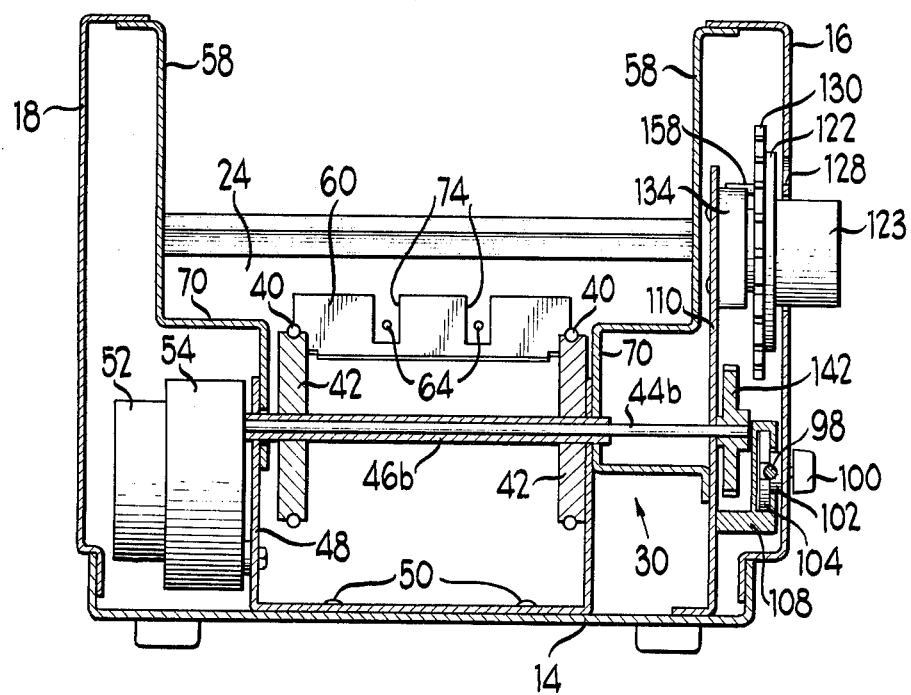

AUTOMATIC TOASTER

BACKGROUND OF THE INVENTION

1. Field of the Invention

This invention relates to bread toasters and in particular to an automatic toaster of the type designed to receive a stack of bread slices and, at periodic intervals, convey the lowermost slice of the stack in proximity to heating elements for toasting of the slice, with the slices thereafter being automatically ejected from the apparatus.

2. Description of the Prior Art

It is known to provide a toasting machine adapted for a stack of superimposed bread slices, the machine being adapted for feeding slices seriatim from the bottom of the stack between a pair of heating elements for toasting. Heretofore, the devices designed for this purpose generally involved the use of a conveyor, chains, etc. in an arrangement which has been complicated to such an extend as to detract measurably from the commercial feasibility of the device. Often these prior art machines had several problems, and, in particular, had a very difficult time attempting to remove the lowermost slice of bread from the stack, especially if the bread is extremely fresh.

SUMMARY OF THE INVENTION

An object of the present invention is to provide an automatic toaster having a simplified and improved bread feeding mechanism which will enable the lowermost bread slice from a generally vertical stack thereof to be conveyed from the bottom of the stack through the toaster.

Briefly, the bread toaster for automatically toasting a predetermined number of bread slices, according to the present invention, includes a housing having a discharge opening at one end. A hopper is provided on the housing at the end opposite the discharge opening for supporting a plurality of vertically stacked slices of bread. Conveyor means mounted on the housing continuously feeds the bread slices, one at a time, between a pair of adjustably mounted heating elements. The heating elements are movable toward and away from the conveyor means for adjusting the amount of toasting of the bread slices. A cam means is provided on the housing adjacent the hopper for engaging the vertical stack of bread slices and slightly lifting all but the bottommost slice upwardly from the conveyor to facilitate feeding of a single slice of fresh bread from the bottom of the stack between the heating elements for toasting. An on-off switch means is connected to a counter so that the toaster can be preset to toast a predetermined number of slices whereafter the counter and switch de-activate the unit.

BRIEF DESCRIPTION OF THE DRAWINGS

FIG. 1 is a front perspective view of a toaster made in accordance with the present invention;

FIG. 2 is a rear perspective view of the toaster of FIG. 1;

FIG. 3 is a vertical section, on an enlarged scale, taken generally along the line 3—3 of FIG. 1;

FIG. 4 is another vertical section, on an enlarged scale, taken generally along line 4—4 of FIG. 1;

FIG. 5 is a vertical section, taken generally along the line 5—5 of FIG. 3;

FIG. 6 is another vertical section, taken generally along the line 6—6 of FIG. 3;

FIG. 7 is a partially fragmented, vertical section, taken generally along the line 7—7 of FIG. 3;

FIG. 8 is a partially fragmented, rear perspective view, of the lifting cam plate of the present invention; and FIG. 9 is another partially fragmented, rear perspective view of the return mechanism and counterswitch of the present invention.

DESCRIPTION OF THE PREFERRED EMBODIMENT

An automatic toaster, generally designated 10, made in accordance with the concepts of the present invention is shown in FIG. 1 to include an elongated, generally rectangular housing 12. The housing 12 comprises a floor or base wall 14, a pair of outer side walls 16 and 18, and a top wall 20. A discharge opening, generally designated 21, is defined at one end of the housing 12 by the top and bottom walls 14 and 20 and the side walls 16 and 18. The top wall 20 extends from the discharge opening to approximately the midpoint of the housing 12. A feed hopper, generally designated 22, for supporting a plurality of generally vertically stacked slices of bread, is defined by an end wall 24, the side walls 16 and 18, and the central end 26 of the top wall 20 (FIG. 2). The term "bread" as used herein shall be deemed to include, in addition to bread slices, hamburger and hotdog buns, english muffins or other pastries, sandwiches and the like.

A conveyor means, generally designated 30, FIGS. 3, 4 and 6, is mounted in the housing 12 and extends generally from an area below the hopper 22 to the discharge opening 21. A heating chamber, generally designated 34, is mounted on the housing between the hopper and the discharge opening for toasting bread slices. Referring again to FIG. 1, a generally vertical stack of bread slices 36 (in phantom) are shown positioned within the hopper 22. The bread slices 36 are fed, one at a time, from the bottom of the stack 36 through the heating chamber 34 for toasting and out through the discharge opening 21 as shown in FIG. 1. A plurality of heat vents 38 are provided on the top and backside of the heating chamber, as shown in FIGS. 1 and 2, to permit convection air currents to flow through the heating chamber 34.

The conveyor means includes a pair of endless, bead-type chain sections 40 which are wrapped about a pair of rollers, located at opposite ends of the housing. Particularly, referring to FIGS. 4 and 6, each roller includes a pair of laterally spaced sprockets 42 rotatably mounted on the housing by sprocket shafts 44a and 44b and sleeves 46a and 46b, respectively. The sprocket shaft 44a is mounted by a U-shaped bracket 46 secured to the bottom wall 14 near the discharge opening 21. The sprocket shaft 44b is mounted in a similar but elongated U-shaped channel 48 secured to the bottom wall 14 by a pair of rivets or screws 50. The chains 40 are driven by an electric motor 52 secured to the channel 48. The motor 52 is drivingly connected to shaft 44b by a commercially available step-down transmission 54 which may be purchased or manufactured as a unitary item with the motor 52. A pair of internal walls 58 (FIG. 6) on either side of the hopper 22 are connected to the top of the channel 48 to add stability to the channel and greater rigidity to the housing 12. A plurality of generally transverse, L-shaped brackets or cogs 60 are secured on their opposite sides to the bead chains 40. The brackets 60 are spaced apart from one another along the chains approximately the width of a slice of bread so as to engage the rearward edge of a slice of bread and feed it into the heating compartment 34 as the conveyor is driven. Four guide support wires 64 are mounted in the housing generally parallel to and at the same elevation as the top of the conveyor chain 40 to additionally support the slice of bread 36 as it moves through the heating chamber. The guide wires 64 are mounted to a generally U-shaped connector 68 at the discharge opening on one end.

Each of the internal walls 58 includes an offset, bottom portion 70 (FIGS. 4, 8 and 9) which mount a generally horizontal cross rod 72 on the outside of the drive shaft 44b. The two outer guides wires 64 are connected to the wall offset portions 70 while the two inner guide wires 64 are connected to the rod 72. Referring to FIGS. 5 and 6, each of the L-shaped cogs 60 includes a pair of generally vertical slots or cutouts 74 which clear the two centermost guide wires 64. Thus, a bread slide on the bottom of the vertical stack 36 is engaged by a cog 60 and moved forwardly through the heating chamber 34 while being supported on the four guide wires 64.

The heating chamber 34 includes two electrical heating elements 80, one above and one below the level of the conveyed bread slices. More particularly, referring to FIG. 5, each heating element is movably mounted by a cantilever arm 82 connected to an elongated channel or yoke 84 which slideably rides on a pair of generally vertical guide posts 86. A pair of springs 88 interconnect the two yokes 84 constantly urging the heating elements toward one another.

Control means, generally designated 90, is provided to vary the degree of toasting of each piece of toast. The control means 90 includes a solid, parallelogram element or cam 92 which is positioned between and in engagement with the yokes 84 to hold them at a predetermined spread position. A crank arm 94 is secured to the cam 92 by a screw 96 to permit rotation of the cam 92. As the cam 92 is rotated in the direction of arrow A (FIG. 3) by the control arm 94, the heating elements 80 will move away from one another and thus away from a bread slice passing through the heating chamber on the conveyor means 30 to decrease the amount of toasting of the bread. The crank arm 94 is connected by an elongated shaft 98 to a manually operable control knob 100 exposed on the front of the housing by a pivotal connector 102, as seen in FIGS. 1 and 3. The pivotal connector includes a generally larger, circular washer 104 which is slideably mounted in a channel 106 defined by a generally L-shaped, internal frame member 108 (FIG. 6). The frame member 108 is secured to a generally vertical, internal flange 110 (FIG. 6) by a plurality of screws 112. A gauge 114 is printed on the outside front of the housing as seen in FIG. 1 adjacent the control knob 100. The gauge ranges from light brown to very dark, and proper alignment of the knob 100 with the particular gauge rating will determine the amount of toasting of the bread.

The toaster 10 also includes a counter, generally designated 120 which energizes the toaster and permits the user to set the toaster so that it will toast a predetermined number of bread slices. The counter 120 includes a pre-settable dial 122 (FIG. 6) which includes a manual cylindrical knob or dial portion 123 extending through an aperture 124 in the side of the housing, as shown in FIG. 1. Indicia 126 indicating the number of slices desired is printed on the counter dial 122 and is visible through an appropriate aperture 128 above the control knob 123. The counter dial includes an outer peripheral notched ring 130 which engages a flexible leaf spring 132 mounted to the interior of the vertical plate 110 for releasably securing the counter dial in its preset position. The counter dial 122 is mounted adjacent a control switch 134 mounted on the wall 110 for energizing the device. The switch 134 is electrically connected by wires (not shown) to the motor 52 and the heating elements 80 to energize the motor and heating elements whenever the counter dial 122 is not in the off position as shown in FIGS. 1 and 3.

A counter drive means, generally designated 140 (FIGS. 3 and 6), incrementally drives the counter dial to the off position as the conveyor means feeds the bread slices 36 through the toaster 10. The counter drive means includes a first drive gear 142 mounted on an elongated or extended end of the main drive shaft 44b for conjoint rotation with the drive motor and the conveyor means 30. The first gear 142 is in meshing engagement with a second gear 144 which is rotatably mounted by a shaft 146 (FIGS. 7 and 9) in the vertical wall 110 and the side wall portions 70. The second drive gear 144 includes a radially directed tab or cam 150 which rotates with the gear 144 in an intersecting path with the notched ring 130 of the counter dial 122. Each time the gear 144 rotates, the tab 150 engages a notch in the ring 130 and causes the counter dial 122 to rotate in a counterclockwise direction, as shown in FIG. 3, by an angle equivalent to the width of one notch. Each time the second drive gear 144 makes one complete revolution, one piece of toast will be discharged through the discharge opening 21 and the counter will be decremented by one. At the end of the cycle, after the last piece of bread enters the heating chamber, the counter is decremented two notches until it reaches the off position.

Referring to FIG. 7, the counter dial 122 is rotatably mounted by a shaft 154 and is spring biased away from the wall 110 by a coil spring 156. Since the tab 150 is in an interference path with the tooth ring 130, to preset the toaster, the knob 122 must be depressed so that the tooth ring 130 is out of engagement with the tab 150 rotated to the desired number.

A rearwardly directed pin 158 on the inner side of the tooth ring 130 engages the switch 134 to deactivate the toaster and terminate power to the conveyor and the heating elements when the dial 122 reaches the "off" position.

A cam lifting means, generally designated 160 (FIGS. 3, 4 and 8) is provided to raise the vertical stack of bread slices off of the lowermost slice 36 to facilitate feeding of only the bottom slice periodically through the toaster 10. The lifting means 160 includes a generally vertically mounted cam plate 162 which is mounted by a pair of generally horizontal, cross-pins 164. The cross-pins 164 are mounted to the internal side walls 58 at the top, and by the offset, inner bottom ends of the wall portions 70 at the bottom. The cam plate includes an L-shaped mounting web 168 on either side of the cam plate 162 which fits within appropriate apertures 170 in the side walls 58 for mounting by the pins 164. The mounting webs 168 each includes a pair of mounting cam slots 172 having a canted portion 174 at its uppermost end.

As the conveyor is started, the bread stack 36 within the hopper 22 will move forward with the conveyor until the second from the bottom and upper bread slices engage the cam plate 162. Continued forward movement of the stack 36 drives the cam plate 162 upwardly on the pins 164 in the canted cam slots 172 which, due to frictional forces, carries the front of all but the lowermost slice of bread upwardly therewith. This lifting is a generally pivotal motion about the leading edge of the lowermost and second bread slices and facilitates the sliding of the lowermost bread slice out from under the stack 36 and into the heating chamber.

Each of the cam slots 172 includes a bottom, rearwardly directed horizontal notch 176 which permits the cam plate 162 to be manually lifted so that the pins 164 engage the notches 176 to maintain the cam plate 162 in its uppermost position. This feature is provided so that items which are thicker than a slice of bread, such as hamburger buns, english muffins and sandwiches, can be fed through the toaster on the conveyor. It should be noted, however, that the cam plate will not provide the lifting operation when maintained in its upper position and therefore these larger items may be placed on the conveyor one at a time for toasting.

Since the stack of slices 36 has been moved forward slightly to engage the cam plate 162, a return means, generally designated 178 (FIGS. 4 and 9), is provided to return the stack to its original position. This return means 178 includes a plurality of generally arcuate fins 180 which are securely mounted on the shaft 146 for rotation therewith. Since the shaft 146, which drives the gear 144, is rotating in a clockwise direction, the fins 180 will also rotate in a clockwise direction. As the fins 180 rotate below the stack of bread slices 36 in engagement with the cam, timed to be subsequent to the feeding of the bottom slice, the fins will engage the second slice, which by now has dropped onto the conveyor, and slide it rearwardly back to the original position. Since the guide wires 64 are supporting the bread slice slightly above the conveyor chains 40, there will be no force tending to urge the stack forwardly and thus it will be returned and the bottommost slice will be engaged by the next cog 60 on the chain.

As described above, once the toaster is turned on, by setting the counter dial to any number of slices, the toaster will automatically feed the bread slices 36 seriatim through the heating chamber 34 until the preset number of slices have been toasted. After the last slice has been toasted, the conveyor will continue to rotate so that the tab 150 will increment the counter to the "off" position which then deenergizes and turns off the toaster as the last slice is delivered from the toaster. Therefore, any number of slices can be automatically and continuously toasted until a predetermined or desired amount have been made. In addition, the darkness gauge permits the user to regulate the amount of toasting of each slice according to his particular preference.

The foregoing detailed description has been given for clearness of understanding only and no unnecessary limitations should be understood therefrom as some modifications will be obvious to those skilled in the art.

We claim:

1. A toaster for automatically toasting a predetermined number of bread slices or the like comprising:
   a housing including a discharge station at one end;
   a loading station on the housing generally at an end opposite from the discharge station for supporting a generally vertical stack of bread slices;
   conveyor means mounted on the housing for continuously feeding the bread slices one at a time from the bottom of the stack through the housing to the discharge station;
   a pair of heating elements mounted on the housing between the loading station and the discharge station, on either side of the conveyor means; and
   lifting means mounted on the housing adjacent the loading station on the side thereof in the direction of travel of the conveyor means for engaging and elevating the slices of bread above the lowermost slice, said lifting means including cam means actuated by the movement of said slices of bread on said conveyor means into engagement therewith for raising all but said lowermost slice relative to the conveyor to facilitate feeding of only the lowermost slice between the heating elements and to the discharge station.

2. The toaster of claim 1 including a counter in driving relationship with said conveyor means for counting the number of bread slices emerging through the discharge station and switch means connected to said heating elements and said conveyor means for energization thereof, said switch means being connected to said counter means for automatically terminating power to the heating elements and the conveyor means after a predetermined number of bread slices have been discharged from the discharge station.

3. The toaster of claim 1 wherein said heating elements are movably mounted for movement in a generally vertical direction toward and away from said conveyor means and includes a darkness gauge interconnected to said movable heating elements for moving said elements toward and away from said conveyor means at presettable increments to vary the amount of toasting for the bread slices.

4. The toaster of claim 1 including return means to move the vertically stacked bread slices in the direction opposite the travel of the conveyor means and away from the lifting means after said lowermost bread slice is removed from the bottom of the stack.

5. A toaster for automatically toasting a predetermined number of bread slices or the like comprising:
   a housing including a discharge station at one end;
   a loading station on the housing generally at an end opposite from the discharge station for supporting a generally vertical stack of bread slices;
   conveyor means mounted on the housing for continuously feeding the bread slices one at a time from the bottom of the stack through the housing to the discharge station;
   a pair of heating elements mounted on the housing between the loading station and the discharge station, on either side of the conveyor means; and
   lifting means mounted on the housing adjacent the loading station on the side thereof in the direction of travel of the conveyor means for engaging and elevating the slices of bread above the lowermost slice, said lifting means including cam means comprising a generally vertical cam plate and a pair of generally horizontally directed opposed pins on the housing in engagement with a pair of canted slots formed in the cam plate which cause the cam plate to raise upwardly when engaged by the moving vertically stacked bread slices to raise all but the lowermost slice relative to the conveyor to facilitate feeding of said lowermost slice between the heating elements.

6. The toaster of claim 5 including return means to move the vertically stacked bread slices in the direction opposite the travel of the conveyor means and away from the cam plate after said lowermost bread slice is removed from the bottom of the stack.

7. The toaster of claim 5 including a notch formed at the lowermost end of each slot for maintaining the cam plate in its uppermost position to facilitate toasting of other items which are substantially thicker than a single slice of bread.

8. A toaster for automatically toasting a predetermined number of bread slices or the like comprising:
   a housing including a discharge station at one end;
   a loading station on the housing generally at an end opposite from the discharge station for supporting a generally vertical stack of bread slices, said loading station being slightly elongated in a direction between the discharge station and the loading station to permit the vertically stacked bread slices to move horizontally;
   conveyor means mounted on the housing for continuously feeding the bread slices one at a time from the bottom of the stack through the housing to the discharge station;
   a pair of heating elements mounted on the housing between the loading station and the discharge station, on either side of the conveyor means; and
   lifting means mounted on the housing adjacent the loading station on the side thereof in the direction of travel of the conveyor means for engaging and elevating the slices of bread above the lowermost slice, said lifting means including cam means comprising a generally vertical cam plate and a pair of generally horizontally directed opposed pins on the housing in engagement with a pair of canted slots formed in the cam plate which cause the cam plate to raise upwardly when engaged by the moving vertically stacked bread slices to raise all but the lowermost slice relative to the conveyor to facilitate feeding of said lowermost slice between the heating elements.

* * * * *